Oct. 29, 1940.  L. B. CASE  2,219,979
COATING MACHINE
Filed Aug. 23, 1939
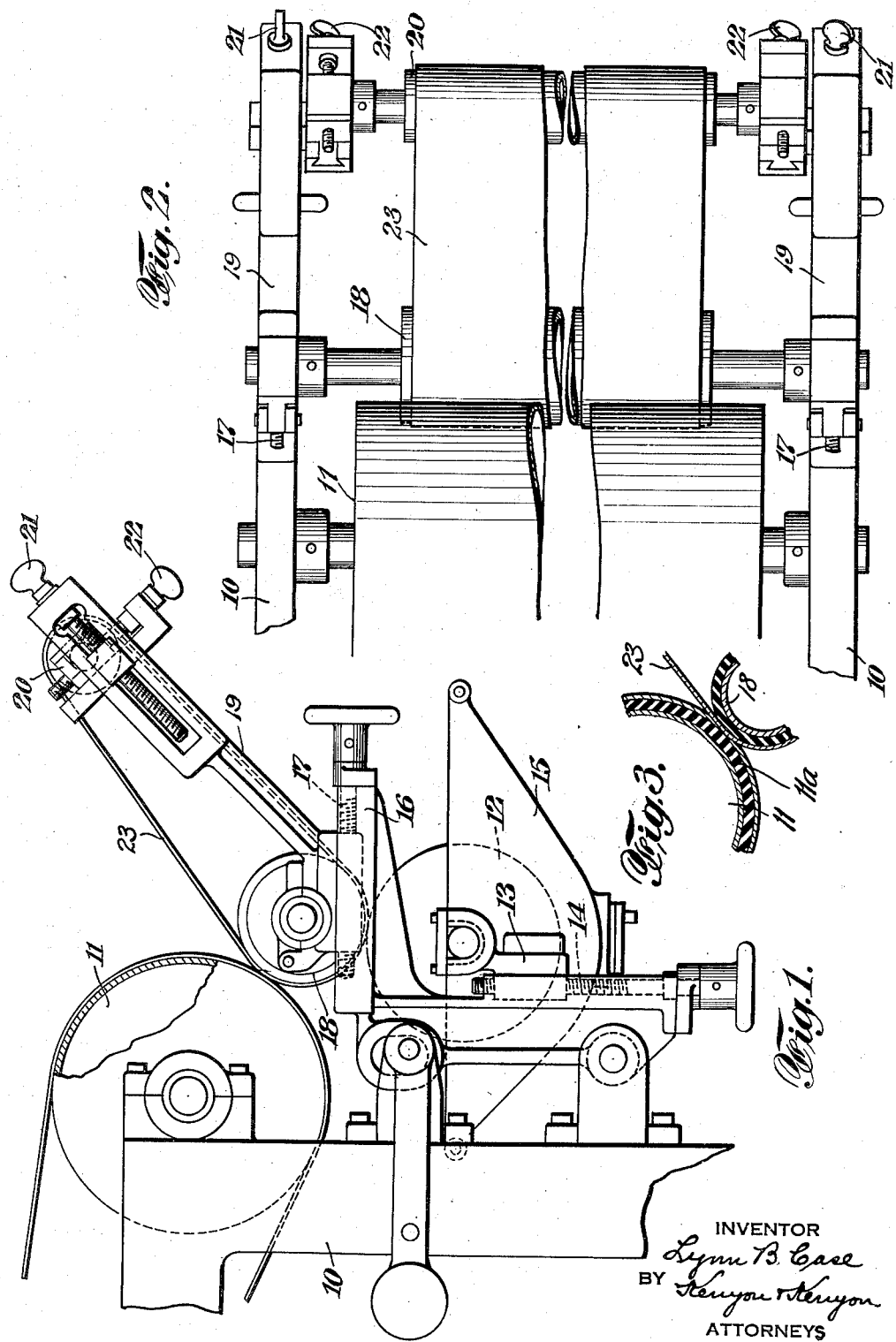

Patented Oct. 29, 1940

2,219,979

UNITED STATES PATENT OFFICE 2,219,979

COATING MACHINE

Lynn B. Case, New Brunswick, N. J., assignor to John Waldron Corporation, New Brunswick, N. J., a corporation of New Jersey Application August 23, 1939, Serial No. 291,521

16 Claims. (Cl. 91—54)

This invention relates to coating machines and more especially to machines for applying a surface of color to a length of paper.

An object of this invention is to provide coating machines with improved means for furnishing coating material to the strip or web to be coated.

Coating machines to which the invention is applicable are provided with a supporting roller around which the web travels during the coating operation and a fountain roller which supplies the coating material from a pan or the like in which the coating material is contained. The furnishing means which is the subject of this invention transfers the coating material from the fountain roller to the paper. A rubber coated roller is supported from the frame of the machine by a stand in contacting relation to the web supporting and fountain rollers and a loop of sieve cloth passes around the rubber surface roller in contact with the fountain roller and with the web supporting roller. The stand also supports a guide roller which co-operates with the rubber surface roller to support the sieve cloth. The sieve cloth is an endless strip of felt of uniform porosity and is the medium by which the coating material is transferred from the fountain roller to the web.

Other objects, novel features and advantages of this invention will become apparent from the following specification and accompanying drawing, wherein:

Fig. 1 is a side elevation of a coating machine embodying the invention,

Fig. 2 is a plan view of the same, and

Fig. 3 illustrates a modification.

A frame 10 rotatably supports a roller 11 around which is pased the web W or strip of paper which is to be coated. Suitable means (not shown) are provided for effecting rotation of the roller 11. A second roller 12 or fountain roller is rotatably supported in adjustable bearing members 13 and feed screws 14 are provided for effecting adjustment of such members. A pan or fountain 15 is supported by the frame 10 and contains a supply of the liquid coating material which is to be applied to the web W. The major portion of the roller 12 is located within the fountain 15 so that a substantial portion of its surface is always immersed in the coating material.

A pair of carriages 16 are supported by the frame 10 for horizontal adjustment and a feed screw 17 is provided for each carriage to effect adjustment thereof. A rubber surface roller 18 is rotatably supported by the carriages and from each carriage a bracket 19 slopes upwardly away from the frame. A roller 20 is rotatably supported at the ends of the brackets 19 by bearings which are adjustable both in a direction radial of the roller and in a direction perpendicular to such radial direction by means of the adjusting screws 21 and 22. A belt or endless loop 23 of sieve cloth passes around the rollers 18 and 20, the tension of said belt being variable by operation of the adjustment screws for the roller 20. The shaft of the roller 18 is equipped with a gear (not shown) which meshes with a gear (not shown) carried on the shaft of the roller 11. The relation of the aforementioned gears is such that the belt 22 advances at the same linear speed as the surface of the roller 11.

In operation of the apparatus, the feed screws 17 are adjusted to bring the roller 18 into proper relation to the roller 11 to cause the sieve cloth to contact the web W under predetermined compression. The roller 12 is adjusted relative to the roller 18 properly to supply the required amount of coating material to the sieve cloth as it passes between the rollers 12 and 18. It is apparent that with this adjustment and with the rollers in operation, the roller 12 picks up the coating material from the fountain 13 and delivers the proper amount of coating material to the loop of sieve cloth which in turn furnishes the coating material to the web passing around the roller 11, thereby supplying such web with a uniform thickness coating.

According to the nature of the paper and the coating material, the roller 11 may have either a metal surface (Fig. 1) or a rubber surface 11a (Fig. 3). When a rubber surface roller is used, the rubber surface of the roller 18 may be thinner than when a metal surface roller 11 is used.

The sieve cloth used as the transfer medium for the coating material is approximately ⅛ inch thick and is a standard commercial product well known in the wallpaper printing trade. It is commonly manufactured in tubular form so that a loop of the cloth may be obtained merely by transverse severance of the tube. When used in combination with a rubber surface roller, the latter provides a cushion for the sieve cloth of such nature that the coating material is applied to the web uniformly and with no trace of smudging or spotting. Any irregularities in the thickness of the sieve cloth is compensated by the rubber so that the surface in contact with the web remains uniformly smooth. In the claims, the term "sieve cloth" is used as descriptive of any type of furnishing medium having sufficient absorptive capacity to carry over to the web a uniform amount of coating material if metered in the fountain by means of the usual pressure roller or doctor blade.

I claim:

1. In combination with a web supporting roller and a fountain roller, a rubber surface roller in contacting relation to both said supporting roller and said fountain roller, and a loop of sieve cloth overlying the rubber surface roller in contact with the other two rollers.

2. In combination with a web supporting roller and a fountain roller, a rubber surface roller in contacting relation to both said supporting roller and said fountain roller, a loop of sieve cloth overlying the rubber surface roller in contact with the other two rollers, and means to rotate said supporting roller and rubber surface roller in timed relation.

3. In combination with a web supporting roller and a fountain roller, a rubber surface roller in contacting relation to both said supporting roller and said fountain roller, a loop of sieve cloth overlying the rubber surface roller in contact with the other two rollers, and a guide roller co-operating with said rubber surface roller to support said loop.

4. In combination with a web supporting roller and a fountain roller, a rubber surface roller in contacting relation to both said supporting roller and said fountain roller, a loop of sieve cloth overlying the rubber surface roller in contact with the other two rollers, a guide roller co-operating with said rubber surface roller to support said loop, and means to rotate said supporting roller and said rubber surface roller in timed relation.

5. In combination with a coating machine consisting of a frame having a web supporting roller and a fountain roller rotatably supported thereby, a stand supported by said frame, a rubber surface roller rotatably mounted on said stand, and a loop of sieve cloth overlying the rubber surface roller in contact with the other two rollers.

6. In combination with a coating machine consisting of a frame having a web supporting roller and a fountain roller rotatably supported thereby, a stand supported by said frame, a rubber surface roller rotatably mounted on said stand, a loop of sieve cloth overlying the rubber surface roller in contact with the other two rollers, and a guide roller rotatably supported by said stand and co-operating with said rubber surface roller to support said loop.

7. A device of the character described comprising a frame, a web supporting roller journalled in said frame, a fountain supported by said frame and containing liquid coating material, a fountain roller rotatably supported by said frame for immersion in coating material contained in said fountain, a rubber surface roller rotatably supported by said frame in contacting relation to both said supporting roller and said fountain roller, and a loop of sieve cloth overlying the rubber surface roller in contact with the other two rollers.

8. A device of the character described comprising a frame, a web supporting roller journalled in said frame, a fountain supported by said frame and containing liquid coating material, a fountain roller rotatably supported by said frame for immersion in coating material contained in said fountain, a rubber surface roller rotatably supported by said frame in contacting relation to both said supporting roller and said fountain roller, a loop of sieve cloth overlying the rubber surface roller in contact with the other two rollers, and a guide roller co-operating with said rubber surface roller to support said loop.

9. A device of the character described comprising a frame, a web supporting roller journalled in said frame, a fountain supported by said frame and containing liquid coating material, a fountain roller rotatably supported by said frame for immersion in coating material contained in said fountain, a stand supported by said frame, a rubber surface roller rotatably mounted in said stand in contacting relation to both said web supporting roller and said fountain roller, and a loop of sieve cloth overlying the rubber roller in contact with the other two rollers.

10. A device of the character described comprising a frame, a web supporting roller journalled in said frame, a fountain supported by said frame and containing liquid coating material, a fountain roller rotatably supported by said frame for immersion in coating material contained in said fountain, a stand supported by said frame, a rubber surface roller rotatably mounted in said stand in contacting relation to both said web supporting roller and said fountain roller, and a loop of sieve cloth overlying the rubber surface roller in contact with the other two rollers, and a guide roller rotatably supported by said stand for co-operation with said rubber surface roller to support said loop.

11. A device according to claim 7 in which the web supporting roller has a rubber surface.

12. A device according to claim 8 in which the web supporting roller has a rubber surface.

13. A device according to claim 9 in which the web supporting roller has a rubber surface.

14. A device according to claim 10 in which the web supporting roller has a rubber surface.

15. A device for use in combination with a coating machine comprising a frame having a web roller and a fountain roller supported thereby, said device consisting of a stand attachable to said frame, a rubber surface roller journalled in said stand for coaction with said web roller and said fountain roller, and a loop of sieve cloth overlying the rubber surface roller for contact with said web roller and said fountain roller.

16. A device for use in combination with a coating machine comprising a frame having a web roller and a fountain roller supported thereby, said device consisting of a stand attachable to said frame, a rubber surface roller journalled in said stand for coaction with said web roller and said fountain roller, a loop of sieve cloth overlying the rubber surface roller for contact with said web roller and said fountain roller, and a guide roller co-operating with said rubber surface roller to support said loop.

LYNN B. CASE.

CERTIFICATE OF CORRECTION.

Patent No. 2,219,979.  October 29, 1940.

LYNN B. CASE.

It is hereby certified that error appears in the printed specification of the above numbered patent requiring correction as follows: Page 1, second column, line 7, for "roller" read --roller 18--; page 2, second column, line 25, claim 9, after the word "rubber" insert --surface--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.